March 3, 1931.  J. E. JOHNSON  1,794,775
PIN BOARD
Filed Nov. 9, 1929
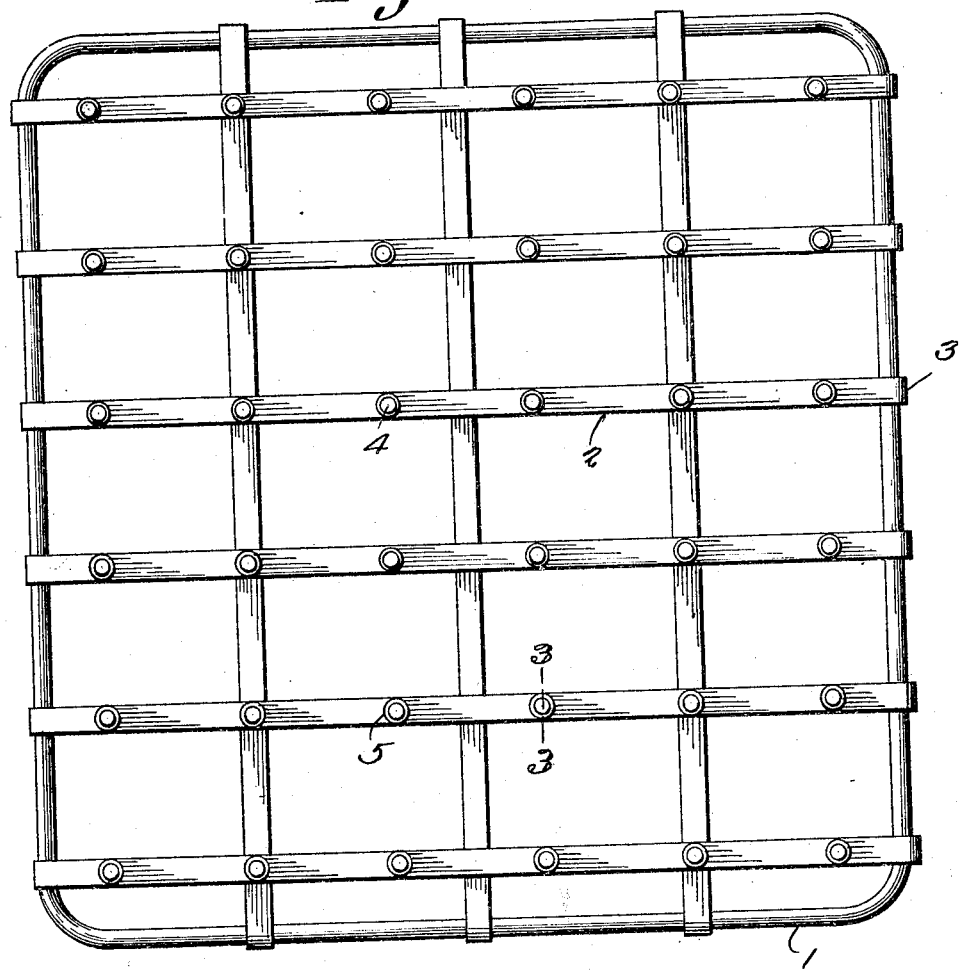
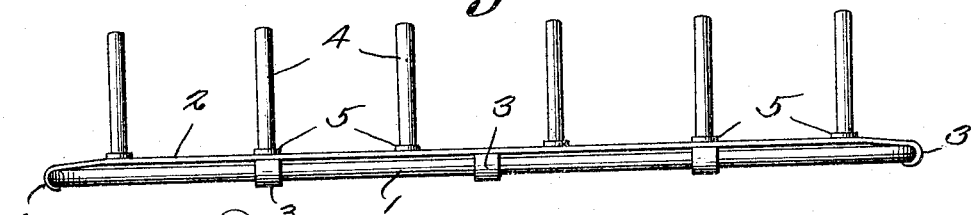
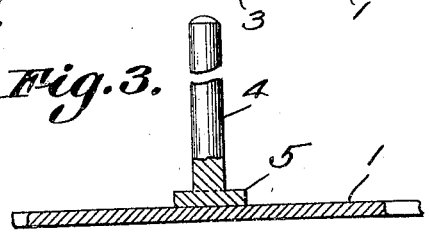
J. E. Johnson
Inventor Patented Mar. 3, 1931

1,794,775

UNITED STATES PATENT OFFICE

JOHN EDWIN JOHNSON, OF WILKES-BARRE, PENNSYLVANIA, ASSIGNOR TO JOHNSON ENGINEERING & MANUFACTURING CO., OF WILKES-BARRE, PENNSYLVANIA

PIN BOARD

Application filed November 9, 1929. Serial No. 406,006.

This invention relates to a pin board such as used by the silk industry for steaming silk on bobbins.

Heretofore pin boards have been made of wire but it has not been possible to make them sufficiently sturdy. It is an object of the present invention to provide a pin board utilizing crossed flat strips joined at their points of crossing by welding, these strips constituting efficient supports for the pins.

Another object is to arrange pins on the strips at desired points either at or between the points of crossing, it being unnecessary to perforate or otherwise weaken the strips in order to join the pins thereto.

A further object is to provide the pins with bases for attachment to the strip and for spacing the heads of the bobbins from the strip, thereby to allow steam to circulate freely through the holes in the bobbins.

With the foregoing and other objects in view, which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawing the preferred form of the invention has been shown.

In said drawing,

Figure 1 is a plan view of a pin board constructed in accordance with the present invention.

Figure 2 is an edge view thereof.

Figure 3 is an enlarged section on line 3—3, Figure 1.

Referring to the figures by characters of reference, 1 designates a frame formed preferably of stiff wire or the like bent to proper form and joined at its ends by welding or in any other suitable manner. On this frame are crossed flat metal strips 2 the ends of which are bent around and suitably connected to the frame as indicated at 3. At the points where the flat strips cross, they are joined by spot welding and at these or any other points desired on the strips are arranged upstanding pins 4 each of which has an enlargement forming a base 5. Each base rests flat upon its supporting strip and is joined thereto by spot welding. This base not only provides an enlarged surface for contact with the strip 2 but also acts as a spacing means whereby a bobbin mounted on the pin 4 will have its head spaced from the strip 2. Thus steam is free to circulate readily through the apertures commonly provided in the head of the bobbin.

It will be seen that a pin board such as described is very durable, can be produced readily and cheaply, and constitutes a more efficient means for holding the bobbin than does the usual type of pin board.

Importance is attached to the fact that it is not necessary to perforate the strips 2 in order to attach the pins to them. The pins can be mounted either at the points of crossing of the strips or between said points and, in every instance, they will be firmly joined by spot welding at the enlarged lower ends or bases provided for them.

What is claimed is:

1. A pin board including a frame, crossed flat strips of metal secured to the frame and joined by welding at their points of crossing, and pins mounted on the strips, each pin including a combined base and spacing means bearing on a strip and joined thereto by welding.

2. A pin board including a frame, crossed flat strips secured thereto and to each other, and pins upstanding from certain of the strips and joined thereto by welding, each of said pins having bobbin spacing means at the base thereof and integral therewith.

3. A pin board including a frame, crossed strips secured to the frame and to each other, said strips being imperforate, pins joined to the strips at one end by welding and extending perpendicularly, and bobbin spacing means integral with the pins and constituting bases thereof.

4. A pin board including a frame, flat metal strips secured thereto, pins upstanding from the strips and joined at one end thereto by welding, and a combined base and bobbin spacing means at one end of each pin.

In testimony that I claim the foregoing as my own, I have hereto affixed my signature.

JOHN EDWIN JOHNSON.